United States Patent

[11] 3,556,365

[72] Inventor Nulan George Bull
 2311 E. 13th St., Cheyenne, Wyo. 82001
[21] Appl. No. 813,496
[22] Filed Apr. 4, 1969
[45] Patented Jan. 19, 1971

[54] SPINNING REEL TRANSFER
 3 Claims, 2 Drawing Figs.
[52] U.S. Cl. .................................................... 224/5,
 43/21.2
[51] Int. Cl. ...................................................... A01k 97/10
[50] Field of Search .......................................... 43/21.2, 22;
 224/5, 5.6, 5.7

[56] References Cited
UNITED STATES PATENTS
2,658,650 11/1953 Jasper ........................... 224/5(.6)
3,009,612 11/1961 Fischett ......................... 224/5(.6)

FOREIGN PATENTS
17,034 12/1915 Great Britain ................ 224/5—7

Primary Examiner—Gerald M. Forlenza
Attorney—Victor J. Evans and Co.

ABSTRACT: A spinning reel transfer mechanism in which a mechanical holder for spinning reel is made of an iron or aluminum cylindrical element supported on a frame shaped to fit the contour of one's body, and is attached to a belt for being buckled around the body. From a lower end of a critical support frame, there is a belt or cloth line which is disposed for being connected with the belt at the rear of the person wearing it, and thus provides means by which a reel is placed on an extension to the mechanical holder leaving the rod free in one hand, if desired, to facilitate casting after the manner of a fly rod.

PATENTED JAN 19 1971 3,556,365

INVENTOR.
NULAN GEORGE BULL
BY
Victor J. Evans & Co.
ATTORNEYS

SPINNING REEL TRANSFER

The present invention relates to an improved rod support for a reel and a butt of the rod which is receivable within a bore in a mounting which leaves both hands free while fishing.

An object of the present invention is to provide a spinning reel which may be mounted on a body-mounted support means or may be transferred from the rod to the extension on the belt.

A further object of the invention is to provide an extension which is connected to one's belt for supporting a reel which is telescopically attached thereto and a line which carried by the rod used for casting the line with fly or bait thereon.

Figure 1:
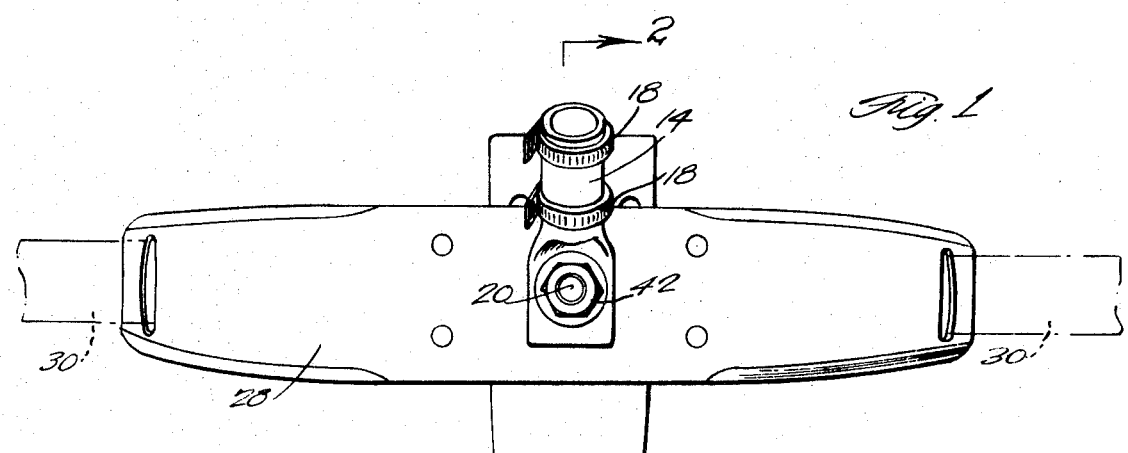
Figure 2:
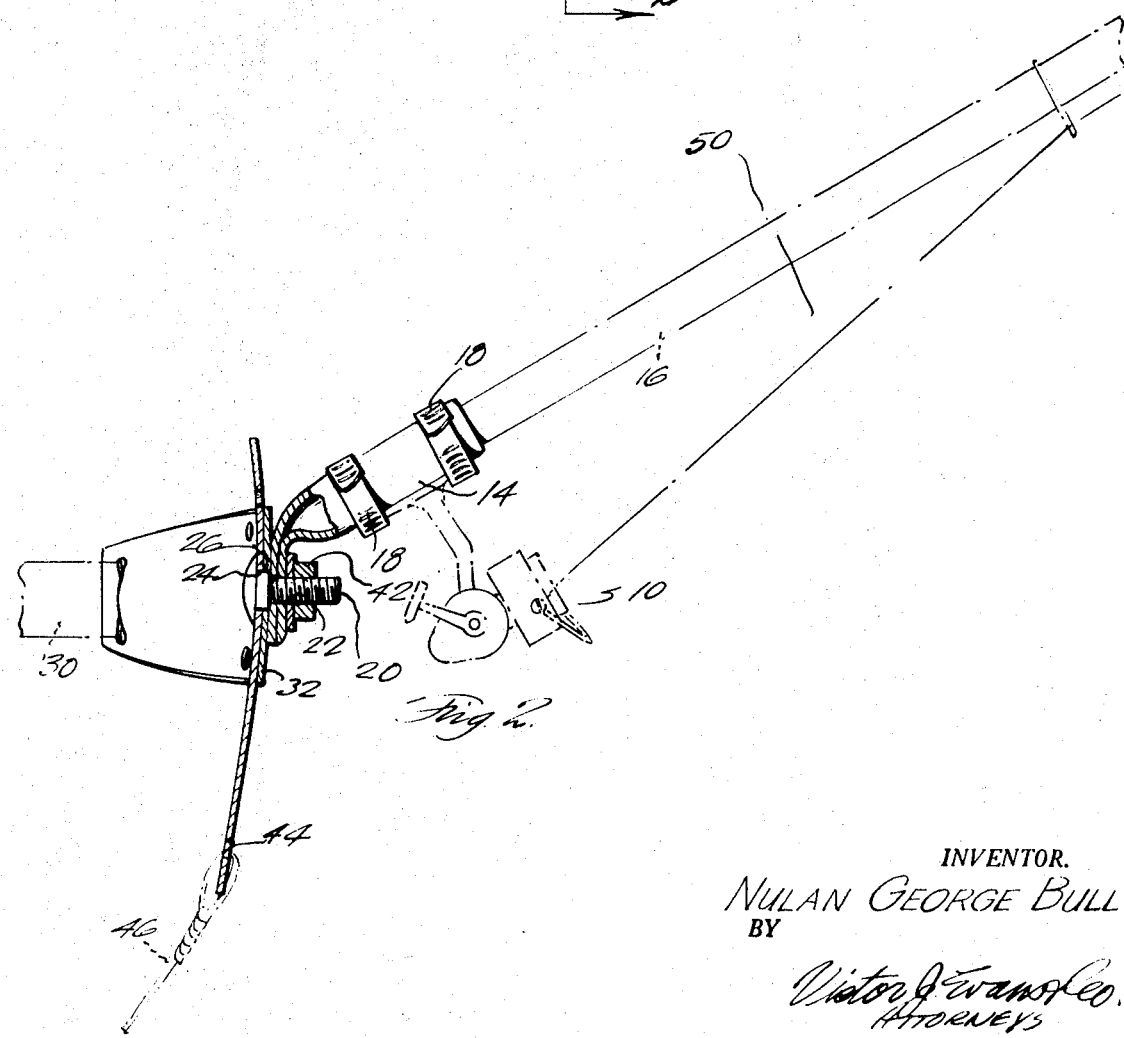

The above and other objects and advantages of the invention will become apparent upon full consideration of the following detailed description and accompanying drawings in which:

FIG. 1 shows a front elevation view of a preferred embodiment of the invention; and FIG. 2 is a cross-sectional view taken along line 2-2 of FIG. 1.

Referring now to the drawings, there is shown a spinning reel transfer apparatus including a spinning reel 10 shown in dotted line in FIG. 2, the spinning reel being supportably mounted from a cylindrical element 14 which is angularly disposed to project a fishing rod 16 mounted in telescopic relation thereto, the fishing rod 16 being conventionally constructed and disposed to be positioned in an inclined relation for conventional use.

The rod 16 telescopically engages within the cylindrical element 14, and the reel 10 is mounted upon the cylindrical element by clamps 18, 18. The end portion of the cylindrical element 14 is flattened and turned to be mounted upon a bolt 20 since the flattened portion has an aperture 22 passing therethrough for receiving said bolt 20. The head portion of the bolt passes through an aperture 24 of an arcuate transverse support member 28 having its ends connected to a waist belt 30, the waist belt being worn by the user. The bolt also passes through a central aperture 26 in a vertical support frame 32 which transversely engages the arcuate support member 28 and also has a contoured surface to conform to the user's body to which it may be applied.

The bolt 20 extends centrally through each of said arcuate support member and said vertical support member. When the head of the bolt is adjacent to one's body, the threaded portion projects outwardly and there is a nut 42 which is threadedly tightened and secured thereon to hold the members together.

At the lower portion or area of the vertical support member, there is an aperture or hole 44 to receive a support line 46 which extends about the body portion of the user and connects with a rear portion of the belt 30.

A line 50 may be wound upon the reel 10, and the line 50 may be used for casting with fly or bait thereon and when casting is done, the rod 16 may be placed within the cylindrical element 14 in its telescopic relation.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

I claim:

1. A spinning reel transfer apparatus for use as a mechanical holder for a spinning reel comprising:

an arcuate transverse support member having its ends connected to a waist belt to be worn by a user, a vertical support frame transversely engaging said arcuate support member and having a contoured surface to conform to the user's body to which it may apply; and a bolt extending centrally through each of said arcuate support member and said vertical support member, a rod-receiving cylindrical element angularly disposed to project a fishing rod in an inclined relation for use, a rod adapted to telescopically engage with said cylindrical element, a reel being mounted upon said cylinder element, and an end portion of said cylindrical element being flattened to be mounted upon said bolt.

2. The invention according to claim 1 wherein a nut is provided on the bolt.

3. The invention according to claim 2 wherein the lower end of said vertical support has an aperture to receive a support line.